(12) United States Patent
Batta et al.

(10) Patent No.: US 11,811,817 B2
(45) Date of Patent: *Nov. 7, 2023

(54) SSL PROXY WHITELISTING

(71) Applicant: Juniper Networks, Inc., Sunnyvale, CA (US)

(72) Inventors: Sarvesh K. Batta, Bangalore (IN); Thyagarajan S. Pasupathy, Karnataka (IN); Mohan Thangavel, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,516

(22) Filed: Oct. 3, 2022

(65) Prior Publication Data
US 2023/0036527 A1 Feb. 2, 2023

Related U.S. Application Data

(63) Continuation of application No. 16/884,866, filed on May 27, 2020, now Pat. No. 11,496,504.

(30) Foreign Application Priority Data

Apr. 13, 2020 (IN) .............................. 202041015922

(51) Int. Cl.
*H04L 29/00* (2006.01)
*H04L 9/40* (2022.01)
*H04L 47/32* (2022.01)

(52) U.S. Cl.
CPC .......... *H04L 63/1433* (2013.01); *H04L 47/32* (2013.01); *H04L 63/0281* (2013.01); *H04L 63/083* (2013.01); *H04L 63/166* (2013.01)

(58) Field of Classification Search
CPC . H04L 63/1433; H04L 47/32; H04L 63/0281; H04L 63/083; H04L 63/166
See application file for complete search history.

(56) References Cited

U.S. PATENT DOCUMENTS

| | | | | |
|---|---|---|---|---|
| 7,389,537 B1 * | 6/2008 | Callon | ................ | H04L 63/1458 713/153 |
| 7,468,956 B1 * | 12/2008 | Leelanivas | .............. | H04L 45/50 370/255 |
| 9,363,232 B1 * | 6/2016 | Adams | ................ | H04L 63/0227 |
| 9,491,188 B1 * | 11/2016 | Allen | .................. | H04L 63/1408 |
| 9,571,411 B1 * | 2/2017 | Shankarappa | .......... | H04L 47/41 |

(Continued)

*Primary Examiner* — Don G Zhao
(74) *Attorney, Agent, or Firm* — Harrity & Harrity, LLP

(57) ABSTRACT

A network device may receive a first data packet. The network device may determine that a level of available computing resources satisfies a threshold level. The network device may perform a secure socket layer (SSL) proxy function based on the level of available computing resources satisfying the threshold level. The network device may receive a second data packet. The network device may determine that the level of available computing resources fails to satisfy the threshold level. The network device may determine a security characteristic associated with the second data packet. The network device may determine a security rating associated with the second data packet based on the security characteristic. The network device may selectively perform the SSL proxy function based on the security rating.

20 Claims, 11 Drawing Sheets

(56) References Cited

U.S. PATENT DOCUMENTS

| | | | | |
|---|---|---|---|---|
| 9,923,798 | B1* | 3/2018 | Bahadur | H04L 45/00 |
| 9,930,012 | B1* | 3/2018 | Clemons, Jr. | H04L 63/0272 |
| 10,587,536 | B1* | 3/2020 | Kwan | H04L 49/9021 |
| 10,623,264 | B2* | 4/2020 | Kompella | H04L 41/0895 |
| 10,666,620 | B1* | 5/2020 | Clemons | H04L 63/1425 |
| 11,188,391 | B1* | 11/2021 | Sule | G06F 9/5055 |
| 11,218,508 | B2* | 1/2022 | Dixit | H04L 63/1408 |
| 11,252,079 | B2* | 2/2022 | Michael | H04L 45/64 |
| 11,252,084 | B1* | 2/2022 | Cai | H04L 45/306 |
| 2008/0192930 | A1* | 8/2008 | Balissat | H04L 63/0209 |
| | | | | 380/255 |
| 2011/0153822 | A1* | 6/2011 | Rajan | H04L 67/14 |
| | | | | 718/1 |
| 2013/0174267 | A1* | 7/2013 | Kass | H04L 63/1441 |
| | | | | 726/26 |
| 2015/0341358 | A1* | 11/2015 | Borovikov | H04W 12/08 |
| | | | | 726/27 |
| 2016/0285822 | A1* | 9/2016 | Adams | H04L 63/02 |
| 2017/0053136 | A1* | 2/2017 | Kadavan | H04L 67/1063 |
| 2018/0144139 | A1* | 5/2018 | Cheng | H04W 4/70 |
| 2018/0145950 | A1* | 5/2018 | Tabares | H04L 61/2514 |
| 2018/0234388 | A1* | 8/2018 | Reddy | H04L 63/061 |
| 2019/0319969 | A1* | 10/2019 | Rodniansky | H04L 63/1416 |
| 2020/0084029 | A1* | 3/2020 | Yang | H04L 63/166 |
| 2020/0100106 | A1* | 3/2020 | Black | H04L 63/0209 |
| 2020/0374353 | A1* | 11/2020 | Walwadkar | H04L 41/0668 |
| 2021/0029165 | A1* | 1/2021 | Fitz-Gerald, Jr. | H04L 63/02 |
| 2021/0058429 | A1* | 2/2021 | Rodniansky | H04L 43/0817 |
| 2021/0067538 | A1* | 3/2021 | Mishra | H04L 63/1433 |
| 2021/0099468 | A1* | 4/2021 | Cabe | G06F 21/53 |
| 2021/0320940 | A1 | 10/2021 | Batta et al. | |

* cited by examiner

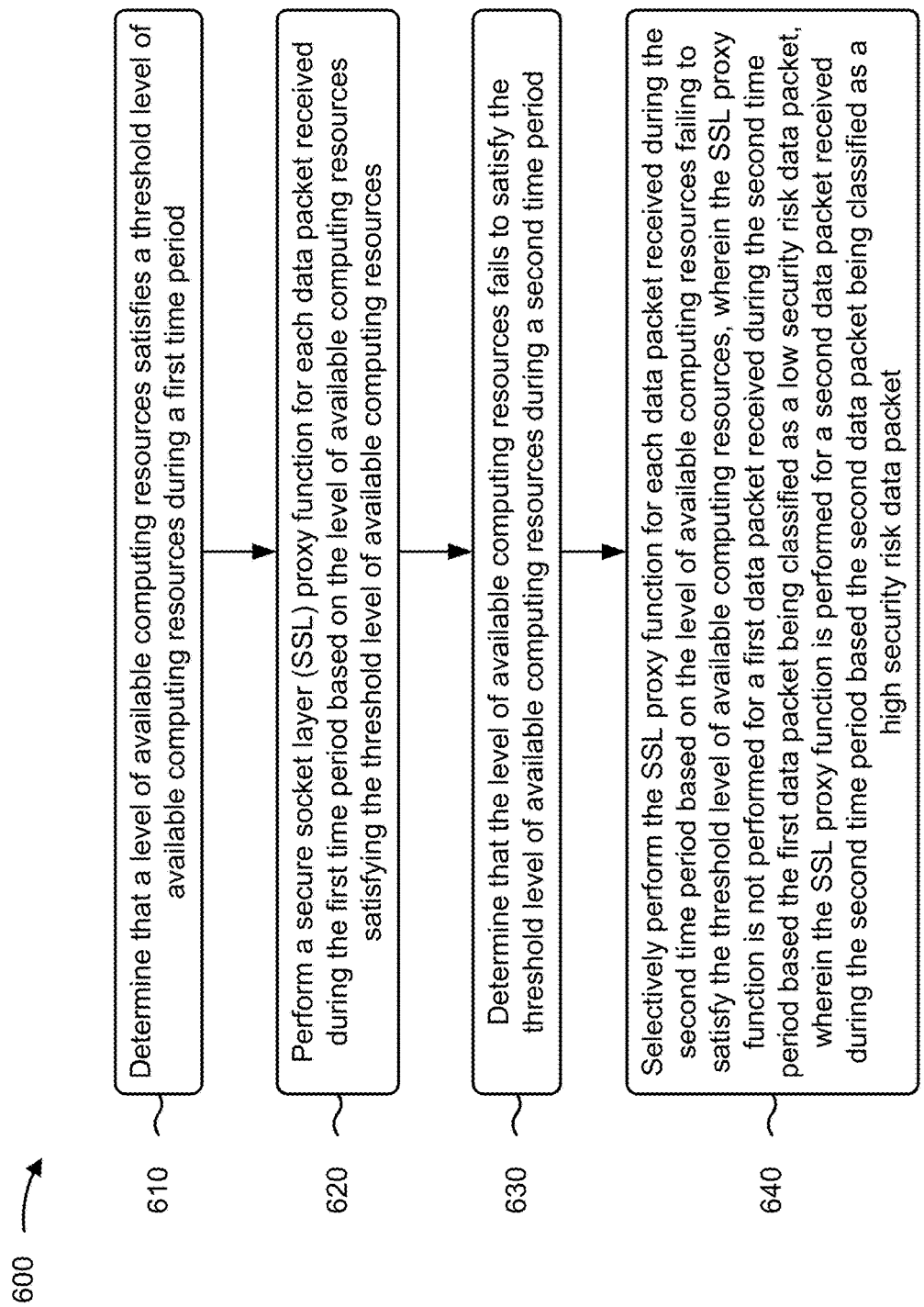

SSL PROXY WHITELISTING

CROSS-REFERENCE TO RELATED APPLICATIONS

This application is a continuation of U.S. patent application Ser. No. 16/884,866, entitled "SSL PROXY WHITELISTING," filed May 27, 2020, which claims priority to Indian Patent Application No. 202041015922, entitled "SSL PROXY WHITELISTING," filed on Apr. 13, 2020, the contents of each of which are incorporated herein by reference in their entireties.

BACKGROUND

Secure sockets layer (SSL) is an application-level protocol that provides encryption technology for data transmitted between a client and a server. SSL utilizes certificates and private-public key exchange pairs to enable the secure transmission of data between a client and a server. SSL proxy is a transparent proxy that performs SSL encryption and decryption for the data transmitted between the client and the server.

SUMMARY

According to some implementations, a method may include receiving, by a network device, a first data packet; determining, by the network device, that a level of available computing resources satisfies a threshold level; performing, by the network device, a secure socket layer (SSL) proxy function based on the level of available computing resources satisfying the threshold level; forwarding, by the network device, the first data packet based on performing the SSL proxy function; receiving, by the network device, a second data packet; determining, by the network device, that the level of available computing resources fails to satisfy the threshold level; determining, by the network device, a security characteristic associated with the second data packet based on the level of available computing resources failing to satisfy the threshold level, wherein the security characteristic is based on: an application vulnerability indication associated with the second data packet, and a user identity indication associated with the second data packet; determining, by the network device, a security rating associated with the second data packet based on the security characteristic; and selectively performing, by the network device, the SSL proxy function based on the security rating, wherein the network device forwards the second data packet without performing the SSL proxy function based on the security rating comprising a first security rating, and wherein the network device performs the SSL function when the security rating comprises a second security rating.

According to some implementations, a device may include one or more memories and one or more processors. The one or more processors may be configured to: receive a data packet; determine that a level of available computing resources fails to satisfy a threshold level of available computing resources; determine a security characteristic associated with the data packet based on the level of available computing resources failing to satisfy the threshold level of available computing resources; determine a security rating associated with the data packet based on the security characteristic; and selectively perform a secure socket layer (SSL) proxy function based on the security rating, wherein the data packet is forwarded without performing the SSL proxy function based on the security rating comprising a first security rating, and wherein the SSL function is performed when the security rating comprises a second security rating.

According to some implementations, a non-transitory computer-readable medium may store one or more instructions. The one or more instructions, when executed by one or more processors of a device, may cause the one or more processors to: determine that a level of available computing resources satisfies a threshold level of available computing resources during a first time period; perform a secure socket layer (SSL) proxy function for each data packet received during the first time period based on the level of available computing resources satisfying the threshold level of available computing resources; determine that the level of available computing resources fails to satisfy the threshold level of available computing resources during a second time period; selectively perform the SSL proxy function for each data packet received during the second time period based on the level of available computing resources failing to satisfy the threshold level of available computing resources, wherein the SSL proxy function is not performed for a first data packet received during the second time period based the first data packet being classified as a low security risk data packet; and wherein the SSL proxy function is performed for a second data packet received during the second time period based the second data packet being classified as a high security risk data packet.

BRIEF DESCRIPTION OF THE DRAWINGS

FIGS. 4-6 are flowchart of example processes for performing SSL proxy whitelisting.

DETAILED DESCRIPTION

The following detailed description of example implementations refers to the accompanying drawings. The same reference numbers in different drawings may identify the same or similar elements.

Secure socket layer (SSL) proxy is performed at a security device (e.g., a firewall) to enable the security device to inspect SSL encrypted data. SSL encrypted data is received at the security device via a SSL/HTTPS session. The SSL proxy splits the SSL/HTTPS session into two sessions. A first session is for data transmitted between a client device and the security device and a second session is for data transmitted between the security device and a server device. The SSL proxy decrypts the SSL encrypted data, performs deep packet inspection on the decrypted data, encrypts the inspected data, and forwards the SSL encrypted data to the server device via the second session.

The security device is equipped with a fail-close mechanism that causes a new session to be dropped when the available computing resources of the security device are insufficient to perform SSL proxy functions. Thus, the security device may prevent authorized users from accessing the server device during periods of high demand.

Some implementations described herein may include a security device that performs SSL proxy whitelisting. When resource utilization is below a threshold level, the security device may perform SSL proxy functions for every session associated with the security device. When resource utilization is greater than a threshold level, the security device may determine security characteristics associated with a data packet and/or a SSL/HTTPS session. The security device may determine a vulnerability rating for the SSL/HTTPS session based on the security characteristics. When the vulnerability rating is determined to be a first vulnerability rating (e.g., safe), the data packet may be forwarded without performing SSL proxy functions (e.g., whitelisted). When the vulnerability rating is determined to be a second vulnerability rating, SSL proxy functions may be performed.

By performing SSL proxy whitelisting, the security device may conserve computing resources during periods of high demand. In this way, a quantity of sessions that can be maintained by the security device may be increased relative to security devices that do not perform SSL proxy whitelisting. By increasing the quantity of sessions that can be maintained by the security device, the security device may prevent authorized users from being denied access to a server during periods of high demand.

FIGS. 1A-1E are diagrams of one or more example implementations 100 described herein. As shown in FIGS. 1A-1E, a security device selectively performs SSL proxy whitelisting based on a resource utilization level of the security device.

Figure 1A:
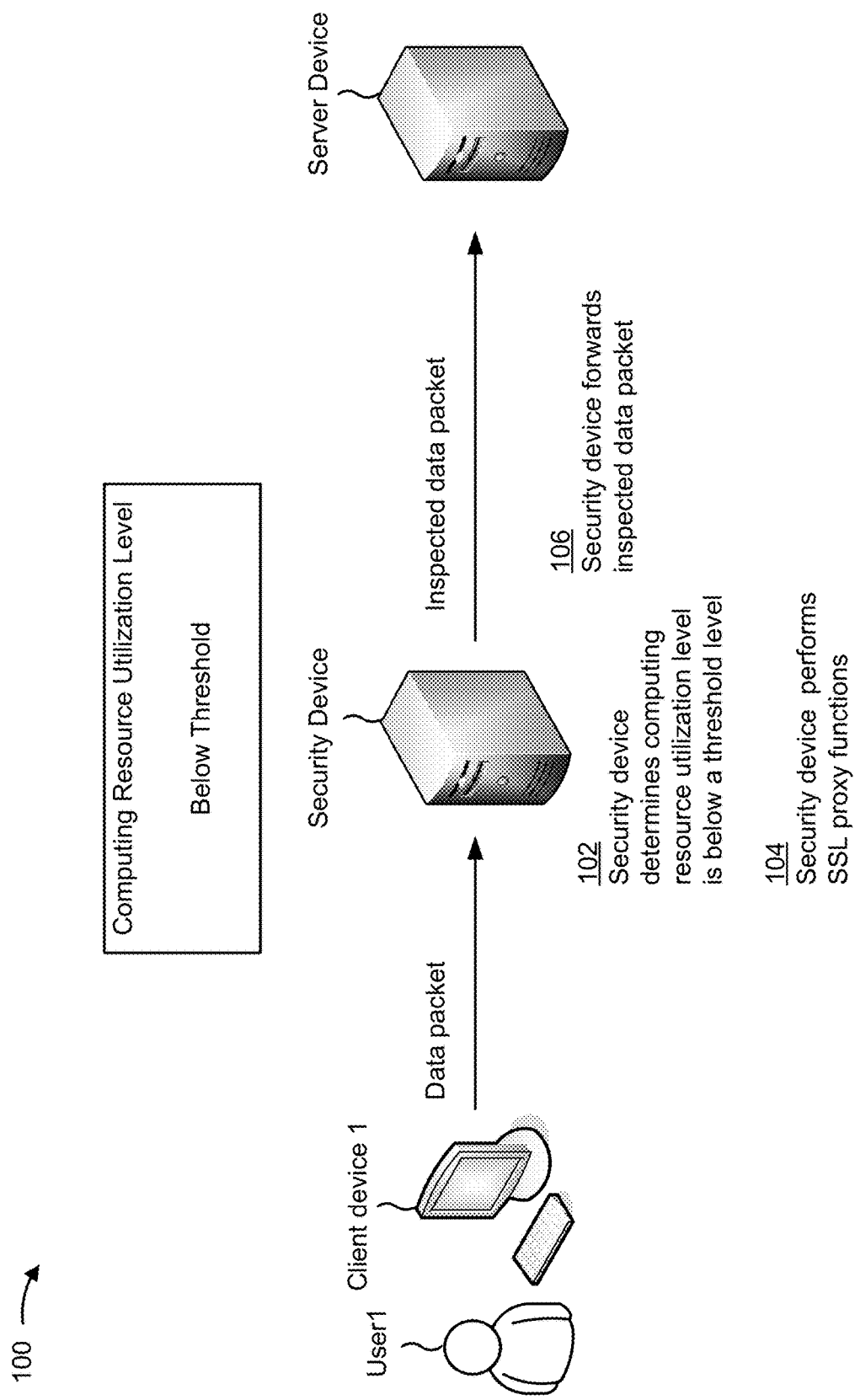
FIGS. 1A-1E are diagrams of one or more example implementations described herein.

As shown in FIG. 1A, a user (shown as User1) utilizes a client device (shown as client device 1) to cause a data packet to be transmitted to a server device. The data packet may include secure socket layer (SSL) encrypted data and may be received via a SSL/HTTPS session. The security device may selectively perform SSL proxy functions on the SSL/HTTPS session based on a computing resource (e.g., processing resource, memory resource, communication resource, and/or the like) utilization level.

The computing resource utilization level may indicate an amount and/or percentage of computing resources currently being utilized by the security device. For example, the computing resource utilization level may indicate a percentage (e.g., 30%, 60%, 90%, and/or the like) of all computing resources, a percentage of processor resources, a percentage of memory resources, a percentage of communication resources, and/or the like currently utilized by the security device.

Alternatively, and/or additionally, the computing resource utilization level may indicate an amount and/or percentage of available computing resources. For example, the computing resource utilization level may indicate a percentage (e.g., 10%, 40%, 60%, and/or the like) of all computing resources, a percentage of processor resources, a percentage of memory resources, a percentage of communication resources, and/or the like available to be utilized by the security device to perform SSL proxy functions on the SSL/HTTPS session.

The security device may determine the computing resource utilization level based on one or more counters. For example, a CPU counter may be incremented based on a processing resource being utilized and may be decremented based on a processing thread no longer being utilized. The security device may query the CPU counter and may determine a percentage of processor resources being utilized based on a response to the query. The security device may determine a percentage of memory resources being utilized, a percentage of communication resources being utilized, and/or the like, in a similar manner.

The security device may selectively perform the SSL processing on the SSL/HTTPS session when the computing resource utilization level satisfies a threshold level. For example, the security device may selectively perform the SSL processing on the SSL/HTTPS session when the computing resource utilization level indicates that over 80% of the computing resources associated with the security device are being utilized, that less than 20% of the computing resources associated with the security device are available to perform SSL proxy functions on the SSL/HTTPS session, and/or the like.

In some implementations, the security device may selectively perform SSL processing based on the computing resource utilization level and one or more other factors, such as a quantity of data packets currently being processed by the security device, a quantity of SSL/HTTPS sessions maintained by the security device, whether a time period during which the data packet was received is associated with a high volume of data packets being transmitted to and/or from the security device, an amount of computing resources being utilized to perform a function other than SSL proxy functions (e.g., an update operation being performed during a period of time associated with a low volume of data packets being transmitted to and/or from the security device), an amount of computing resources required to perform SSL proxy functions for the SSL/HTTPS session, and/or the like. The above-listed factors are intended to be merely examples of types of factors that may be used. In practice, the factors may include any one or more of the above-listed factors and/or one or more other types of factors not listed above.

As shown by reference number 102, the security device determines that the computing resource utilization level is below a threshold level. As shown by reference number 104, the security device performs SSL proxy functions on the SSL/HTTPS session based on the computing resource utilization level being below the threshold level.

For example, the security device may split the SSL/HTTPS session into two sessions. A first session is for data transmitted between the client device and the security device. A second session is for data transmitted between the security device and the server device. The security device decrypts the SSL encrypted data (e.g., the data packet received from the client device), performs deep packet inspection on the decrypted data, and encrypts the inspected data. As shown by reference number 106, the security device forwards the encrypted, inspected data packet to the server device via the second session.

Figure 1B:
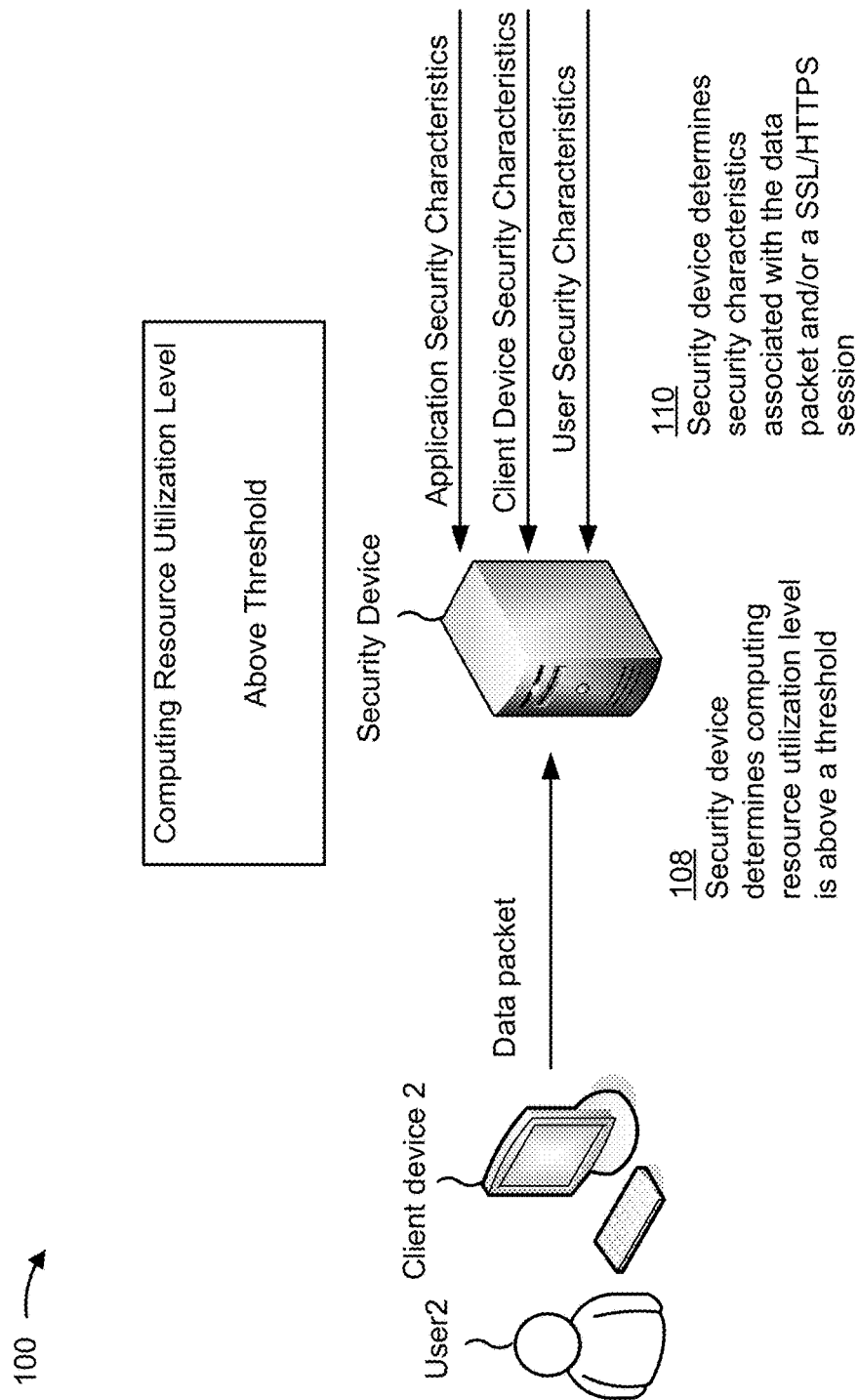

As shown in FIG. 1B, another user (shown as User2) utilizes another client device (shown as client device 2) to cause another data packet to be transmitted to the server device. The other data packet may include SSL encrypted data and may be received via a second SSL/HTTPS session. The security device may determine the computing resource utilization level based on receiving the data packet. In some implementations, the security device determines the computing resource utilization level in a manner similar to that described above with respect to FIG. 1A.

As shown by reference number 108, the security device determines that the computing resource utilization level is above a threshold level. The security device determines to selectively perform SSL proxy functions on the second SSL/HTTPS session based on the computing resource utilization level being above the threshold level. The security device may whitelist the second SSL/HTTPS session (e.g., forward the data packet to the server device without performing an SSL proxy function on the second SSL/HTTPS session) based on a security rating associated with the data packet. The security rating may be determined based on one or more security characteristics associated with the data packet and/or one or more security characteristics associated with the second SSL/HTTPS session.

As shown by reference number 110, the security device determines security characteristics associated with the data packet and/or the second SSL/HTTPS session. The security characteristics may include one or more application security characteristics, one or more user security characteristics, one or more client device security characteristics, and/or the like.

The application security characteristics may include one or more security characteristics associated with an application associated with the data packet such as a L7+ application vulnerability rating associated with the application, a server-to-client vulnerability associated with the application, a client-to-server vulnerability associated with the application, and/or the like. The above-listed application security characteristics are intended to be merely examples of types of application security characteristics that may be used. In practice, the application security characteristics may include any one or more of the above-listed application security characteristics and/or one or more other types of application security characteristics not listed above.

The security device may determine the application security characteristics based on information obtained from a device associated with a vendor of the security device, information obtained by a device associated with a third party that performs security assessments of websites, information obtained by a device associated with a third party that provides ratings of websites, information determined by the security device based on historic processing and/or reporting of vulnerabilities, information obtained from another security device, information input by a user identifying one or more safe applications, information input by a user identifying one or more unsafe applications, and/or the like.

The user security characteristics may include one or more security characteristics associated with a user associated with the data packet (e.g., User2). For example, the user security characteristics may include information indicating that the user is associated with computer or cyber-based criminal activity, information indicating that the user is associated with a blacklisted user, information indicating that the user is associated with an organization associated with illegal, unlawful, unethical, and/or the like activity, information indicating that the user is associated with a security-to-client vulnerability, information indicating that the user is associated with a client-to-server vulnerability, information indicating that the user is associated with a valid username and/or password, and/or the like. The above-listed user security characteristics are intended to be merely examples of types of user security characteristics that may be used. In practice, the user security characteristics may include any one or more of the above-listed user security characteristics and/or one or more other types of user security characteristics not listed above.

The security device may obtain the user security information based on information obtained from a governmental database, information obtained from a device associated with a third party that provides information regarding users associated with security vulnerabilities, successfully authenticating the user (e.g., the user providing a valid username and/or password), information input by a user identifying one or more safe users, information input by a user identifying one or more unsafe and/or high-risk users, information included in a user profile associated with the user, and/or the like.

The client device security characteristics may include one or more security characteristics associated with a client device associated with the data packet (e.g., client device 2). For example, the client device security characteristics may include information indicating that the client device is associated with a valid client certificate, information indicating that the client device is associated with a client-to-server vulnerability, information indicating that the client device is associated with an authorized user, information indicating that the client device is associated with an unauthorized user, a user associated with the client device, a physical location of the client device (e.g., located in a public area, located in a secure area, located in an office associated with the user, located in a home of the user, and/or the like), a quantity of times the user utilizes the client device to transmit data packets to the server device, and/or the like. The above-listed client device security characteristics are intended to be merely examples of types of client device security characteristics that may be used. In practice, the client device security characteristics may include any one or more of the above-listed client device security characteristics and/or one or more other types of client device security characteristics not listed above.

The security device may determine the client device security characteristics based on a valid client certificate associated with the client device, information input by a user indicating one or more safe client devices, information input by a user indicating one or more unsafe client devices, client device information determined by the security device based on historical security information associated with data packets transmitted by the client device, client device security characteristics obtained from another security device, and/or the like.

The security device may analyze the application security characteristics and may determine an application security rating associated with the application based on the application security characteristics (e.g., safe, low vulnerability, moderately safe, vulnerable, high vulnerability, evasive, and/or the like). The security device may analyze the user security characteristics and may determine a user security rating associated with the user based on the user security characteristics (e.g., safe, authorized, unsafe, unauthorized, low risk, medium risk, high risk, and/or the like). The security device may analyze the client device security characteristics and may determine a client device security rating (e.g., safe, unsafe, validated, unvalidated, low risk, medium risk, high risk, and/or the like).

In some implementations, the security device may determine a security rating associated with the second SSL/HTTPS session based on the application security rating, the user security rating, and/or the client device security rating. For example, the security device may determine a security rating of safe for the second SSL/HTTPS session when the application security rating, the user security rating, and/or the client device security rating satisfy a first threshold rating (e.g., safe, low risk, authorized, and/or the like). The security device may determine a security rating of unsafe for the second SSL/HTTPS session when one or more of the application security rating, the user security rating, and/or the client device security rating fail to satisfy the threshold rating and/or satisfy a second threshold rating (e.g., high risk, vulnerable, unsafe, and/or the like).

In some implementations, the security device uses a machine learning model, such as a security rating model, to determine the security rating for the second SSL/HTTPS session. For example, the security device may train the security rating model based on one or more security characteristics, such as one or more application security characteristics, one or more user security characteristics, one or more client device security characteristics, and/or the like. The security device may train the security rating model using historical data associated with applications, users, and/or client devices according to the one or more security characteristics. Using the historical data and the one or more security characteristics as inputs to the security rating model, the security device may determine a security rating associated with the second SSL/HTTPS session.

Figure 1C:
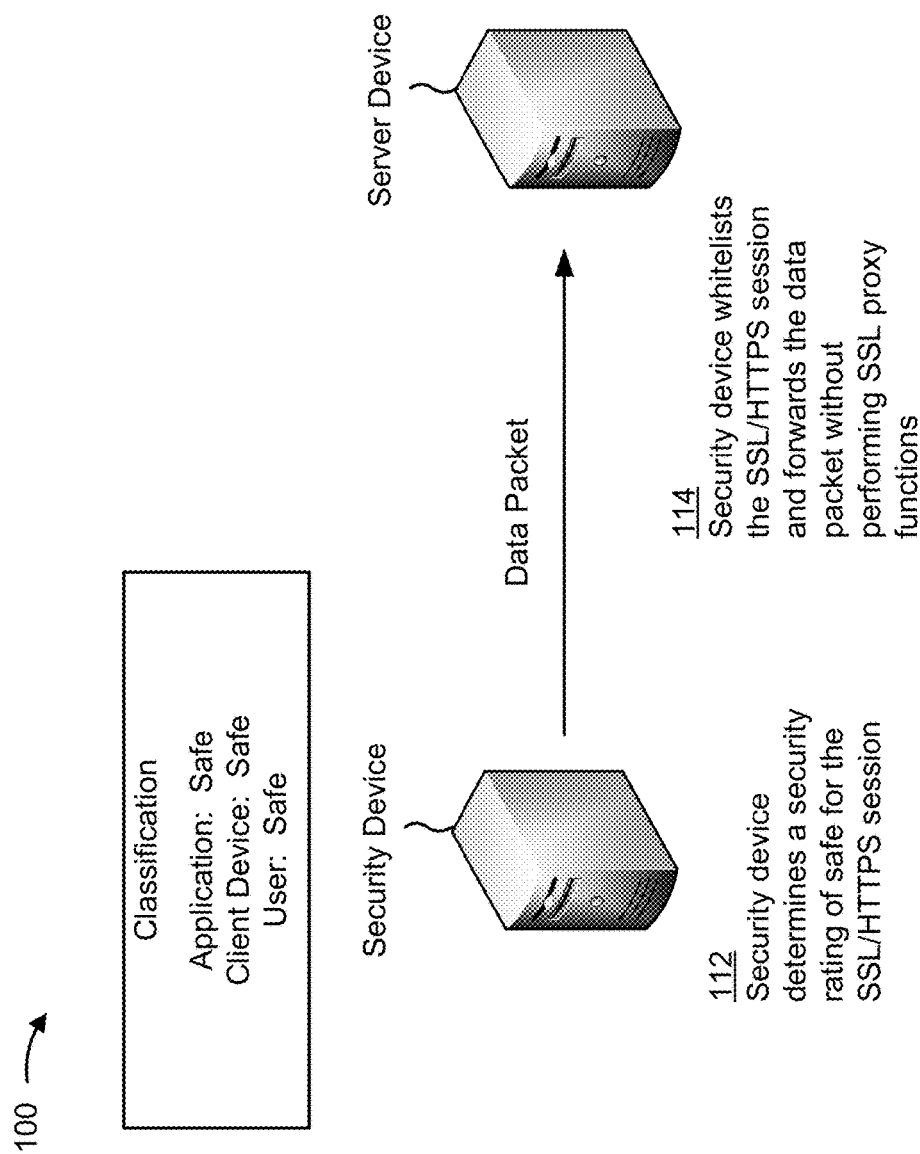

As shown in FIG. 1C, the security device determines the application security rating as safe, the client device security rating as safe, and the user security rating as safe based on the security characteristics. For example, the security device may determine the application security rating as vulnerable safe based on a L7+ application rating and/or a health report associated with the application indicating that an application associated with the data packet is safe. The security device may determine the user security rating as safe based on determining that the user is included in a list of "safe" users stored in a memory of the security device. The security device may determine the client device security rating as safe based on determining that the client device is physically located in a secure area.

The security device may determine that the application security rating, the client device security rating, and the user security rating satisfy the first threshold rating. As shown by reference number 112, the security device determines a security rating of safe for the second SSL/HTTPS session based on the application security rating, the client device security rating, and the user security rating satisfy the first threshold rating.

As shown by reference number 114, the security device whitelists the second SSL/HTTPS session based on determining the security rating of safe for the second SSL/HTTPS session. For example, the security device may add information relating to the data packet, such as the source address, the destination address, an identifier associated with the second SSL/HTTPS session, information identifying the security rating, information identifying the application, information identifying the user, information identifying the client device, and/or the like to a table that stores information identifying data packets for which performance of SSL proxy functions can be bypassed.

The security device forwards the data packet to the server device without performing SSL proxy functions on the second SSL/HTTPS session based on whitelisting the second SSL/HTTPS session. By whitelisting the second SSL/HTTPS session, the security device may conserve computing resources by forwarding data packets received via SSL/HTTPS sessions determined to be safe, low risk, and/or the like without performing SSL proxy functions. In this way, a quantity of sessions that can be maintained by the security device may be increased relative to a security device that performs SSL proxy functions on every SSL/HTTPS session (e.g., with no whitelisting). By increasing the quantity of sessions that can be maintained by the security device, the security device may prevent authorized users from being denied access to a server during periods of high demand.

Figure 1D:
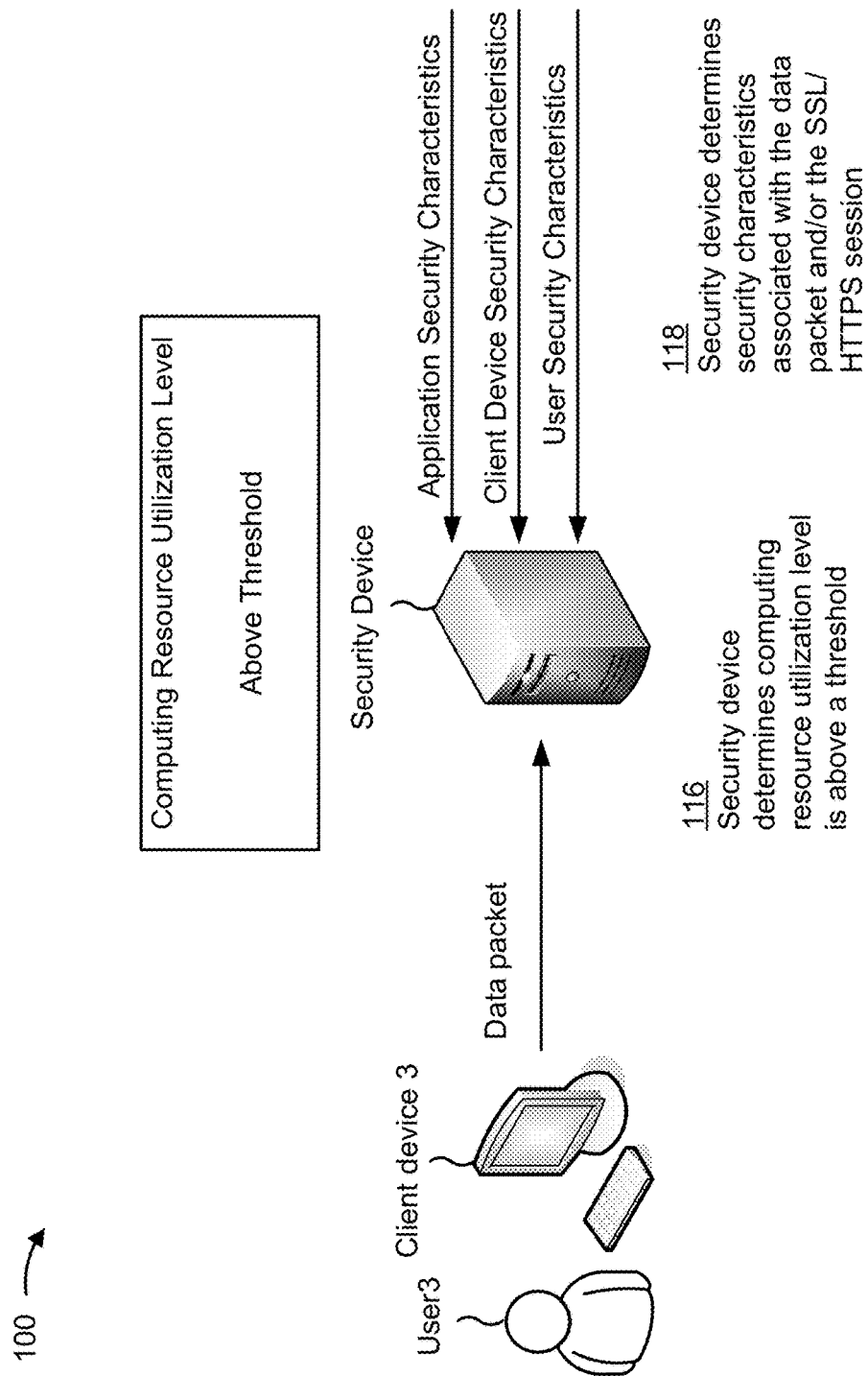

As shown in FIG. 1D, another user (shown as User3) utilizes another client device (shown as client device 3) to cause another data packet to be transmitted to the server device. The other data packet may include SSL encrypted data and may be received via a third SSL/HTTPS session. The security device may determine the computing resource utilization level based on receiving the data packet. In some implementations, the security device determines the computing resource utilization level in a manner similar to that described above with respect to FIG. 1A.

As shown by reference number 116, the security device determines that the computing resource utilization level is above a threshold level. The security device determines to selectively perform SSL proxy functions on the third SSL/HTTPS session based on the computing resource utilization level being above the threshold level. The security device may whitelist the third SSL/HTTPS session based on a security rating associated with the data packet. The security rating may be determined based on one or more security characteristics associated with the data packet and/or the third SSL/HTTPS session.

As shown by reference number 118, the security device determines security characteristics associated with the data packet and/or the third SSL/HTTPS session. In some implementations, the security device may determine the security characteristics in a manner similar to that described above with respect to FIG. 1B.

The security device may determine a security rating for the third SSL/HTTPS session based on the security characteristics. In some implementations, the security device determines the security rating for the third SSL/HTTPS session in a manner similar to that described above with respect to FIG. 1B.

Figure 1E:
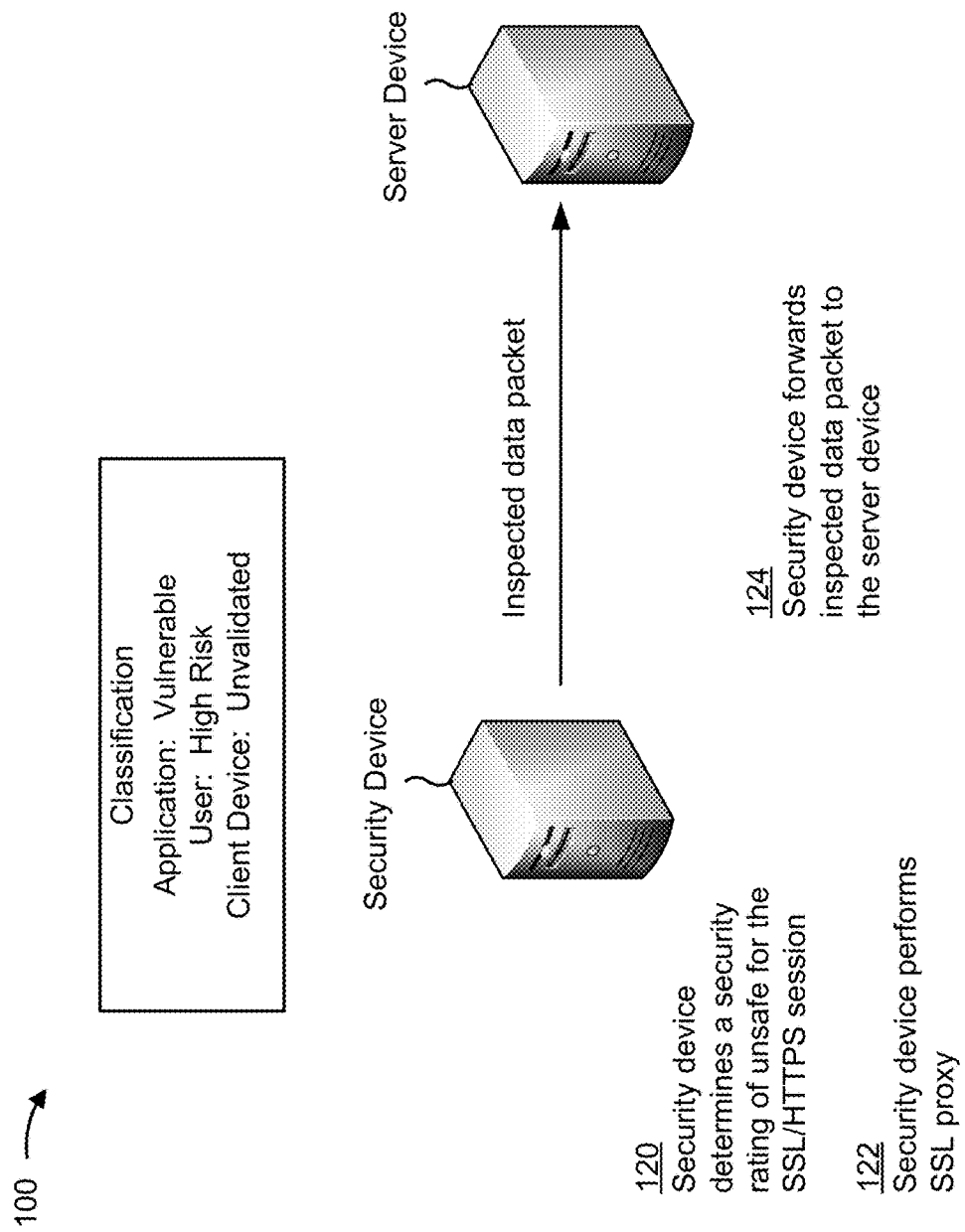

As shown in FIG. 1E, the security device determines the application security rating as vulnerable, the user security rating as high risk, and the client device security rating as unvalidated. For example, the security device may determine the application security rating as vulnerable based on a L7+ application rating and/or a health report associated with the application indicating that an application associated with the data packet is vulnerable with respect to one or more known security issues. The security device may determine the user security rating as high risk based on determining that the user is not included in a list of "safe" users stored in a memory of the security device, information obtained from a governmental database indicating that the user is associated with a security breach, and/or the like. The security device may determine the client device security rating as unvalidated based on a client certificate associated with the client device being expired.

As shown by reference number 120, the security device determines a security rating of unsafe for the third SSL/HTTPS session based on the application security rating, the user security rating, and/or the client device security rating failing to satisfy the first threshold and/or satisfying the second threshold.

As shown by reference number 122, the security device performs SSL proxy functions on the third SSL/HTTPS session based on the security rating being determined as unsafe. In some implementations, the security device determines not to forward the data packet to the server device based on performing SSL proxy functions. For example, the security device may decrypt the encrypted data packet and a perform deep packet inspection process on the decrypted data packet. The security device may detect a security issue associated with the data packet based on performing the deep packet inspection process (e.g., that the data packet contains malicious code). The security device may perform one or more actions based on determining the security issue. For example, the security device may blacklist the third SSL/HTTPS session (e.g., store information associated with the data packet, the third SSL/HTTPS session, the security issue, the user, the application, the client device, and/or the like in a data structure (e.g., a database stored in a memory associated with the security device) indicating that SSL proxy functions are to be performed on data packets associated with the third SSL/HTTPS session, data packets associated with the user, data packets associated with the application, data packets associated with the client device, and/or the like), may prevent the data packet from being forwarded to the server device, may drop the data packet, may provide information associated with the data packet, the security issue, the user, the application, the client device, and/or the like to another security device, and/or the like.

In other implementations, as shown in FIG. 1E, and by reference number 124, the security device forwards the data packet to the server device based on performing SSL proxy functions on the third SSL/HTTPS session.

As indicated above, FIGS. 1A-1E are provided merely as one or more examples. Other examples may differ from what is described with regard to FIGS. 1A-1E.

Figure 2:
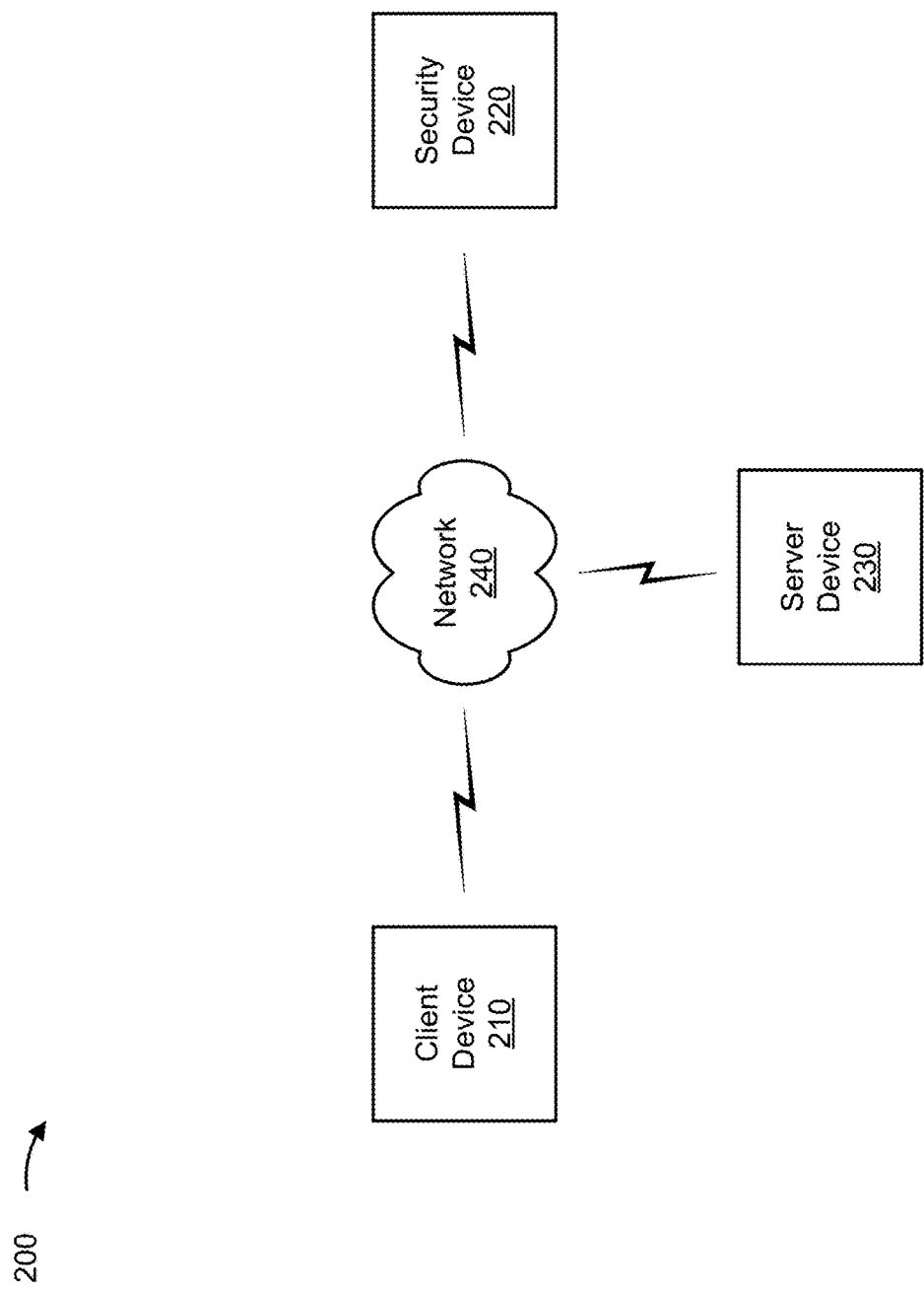
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a security device 220, a server device 230, and a network 240. Devices of environment 200 may interconnect via wired connections, wireless connections, or a combination of wired and wireless connections.

Client device 210 includes one or more devices capable of receiving and/or providing information over a network (e.g., network 240) as described herein. For example, client device 210 may include a computing device, such as a laptop computer, a tablet computer, a handheld computer, a desktop computer, a mobile phone (e.g., a smart phone, a radiotelephone, etc.), a personal digital assistant, or a similar device. Client device 210 may receive information from and/or provide information to server device 230 (e.g., via network 240 and/or security device 220). In some implementations, client device 210 may include a browser used to interact with server device 230, such as by sending requests (e.g., HTTP requests) to server device 230 and/or receiving responses (e.g., HTTP responses) from server device 230. In some implementations, requests from client device 210 may be processed by security device 220 before being sent to server device 230 as described herein.

Security device 220 may include one or more devices capable of processing and/or transferring traffic between client device 210 and server device 230. For example, security device 220 may include a network device, such as a reverse proxy, a server (e.g., a proxy server), a traffic transfer device, a gateway, a firewall, a router, a bridge, a hub, a switch, a load balancer, or the like. Security device 220 may selectively perform SSL proxy functions on SSL/HTTPS sessions based on a computing resource utilization level, as described herein. In some implementations, security device 220 may be a physical device implemented within a housing, such as a chassis. In some implementations, security device 220 may be a virtual device implemented by one or more computer devices of a cloud computing environment or a data center.

Security device 220 may be used in connection with a single server device 230 or a group of server devices 230 (e.g., a data center). Communications may be routed through security device 220 to reach the one or more server devices 230. For example, security device 220 may be positioned within a network as a gateway to a private network that includes one or more server devices 230. Additionally, or alternatively, communications from client device 210 may be encoded such that the communications are routed to security device 220 before being routed to server device 230.

Server device 230 may include one or more devices capable of receiving and/or providing information over a network (e.g., network 240), and/or capable of generating, storing, and/or processing information received and/or provided over the network. For example, server device 230 may include a computing device, such as a server (e.g., an application server, a content server, a host server, a web server, etc.) or a similar device. Server device 230 may receive information from and/or provide information to client device 210 (e.g., via network 240 and/or security device 220). Server device 230 may respond to requests (e.g., requests for resources) received from client device 210. In some implementations, responses from server device 230 may be processed by security device 220 before being sent to client device 210.

Network 240 may include one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
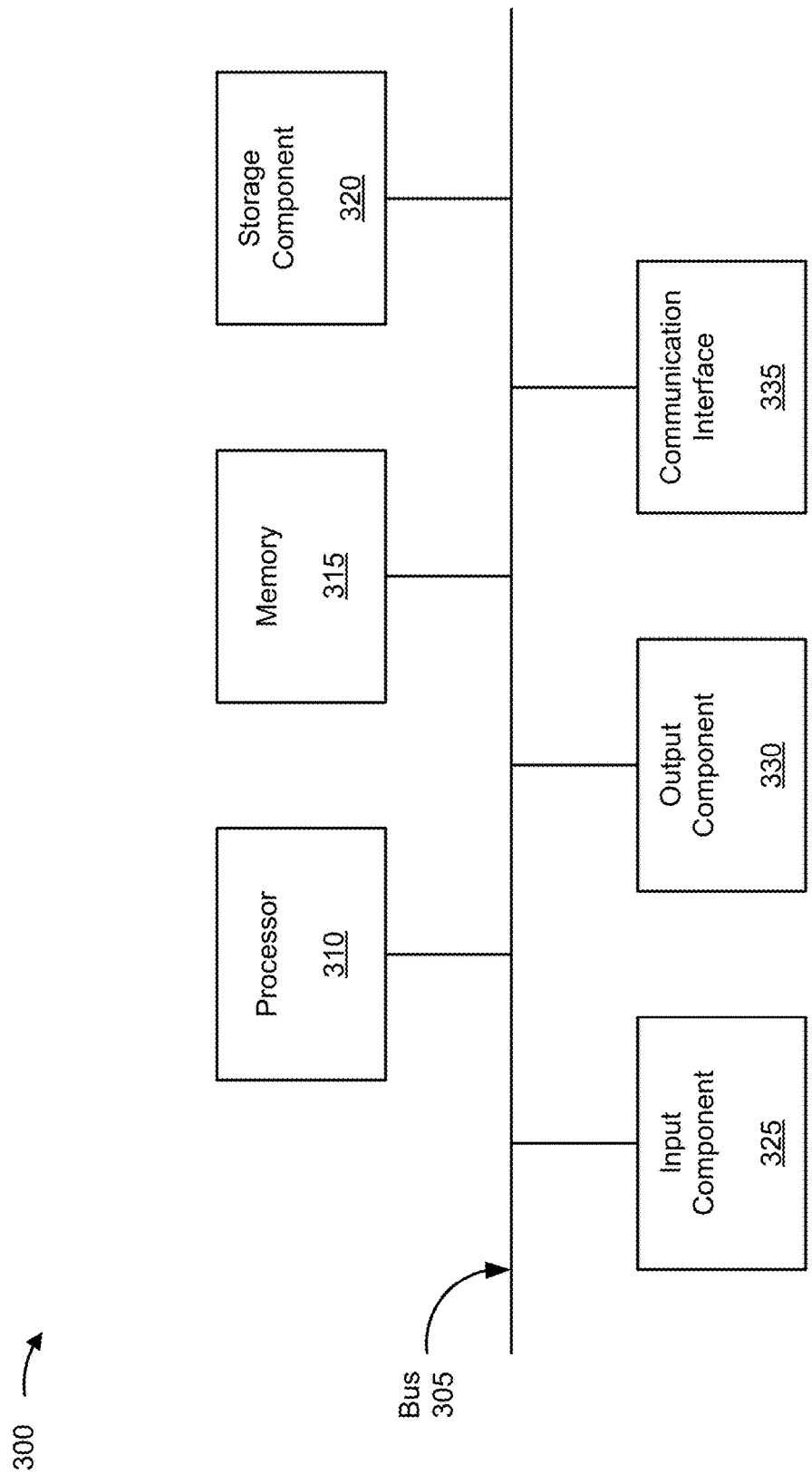
FIGS. 3A-3B are diagrams of example components of one or more devices of FIG. 2.

FIG. 3A is a diagram of example components of a device 300. Device 300 may correspond to client device 210, security device 220, and/or server device 230. In some implementations, client device 210, security device 220, and/or server device 230 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
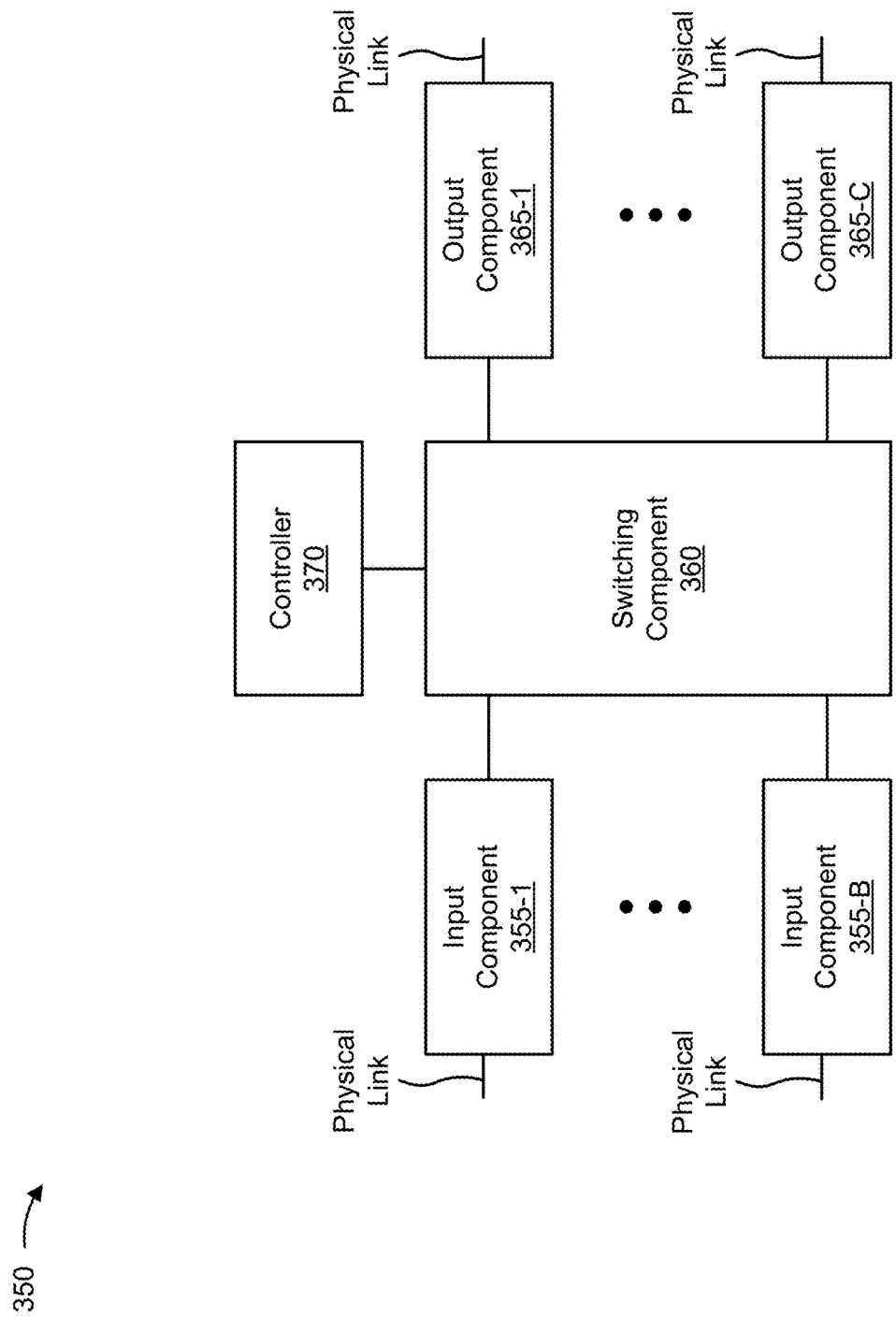

FIG. 3B is a diagram of example components of a device 350. Device 350 may correspond to one or more of client device 210, security device 220, and/or server device 230. In some implementations, one or more client device 210, security device 220, and/or server device 230 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input components 355 may process incoming traffic, such as by performing data link layer encapsulation or decapsulation. In some implementations, input components 355 may send and/or receive packets. In some implementations, input components 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
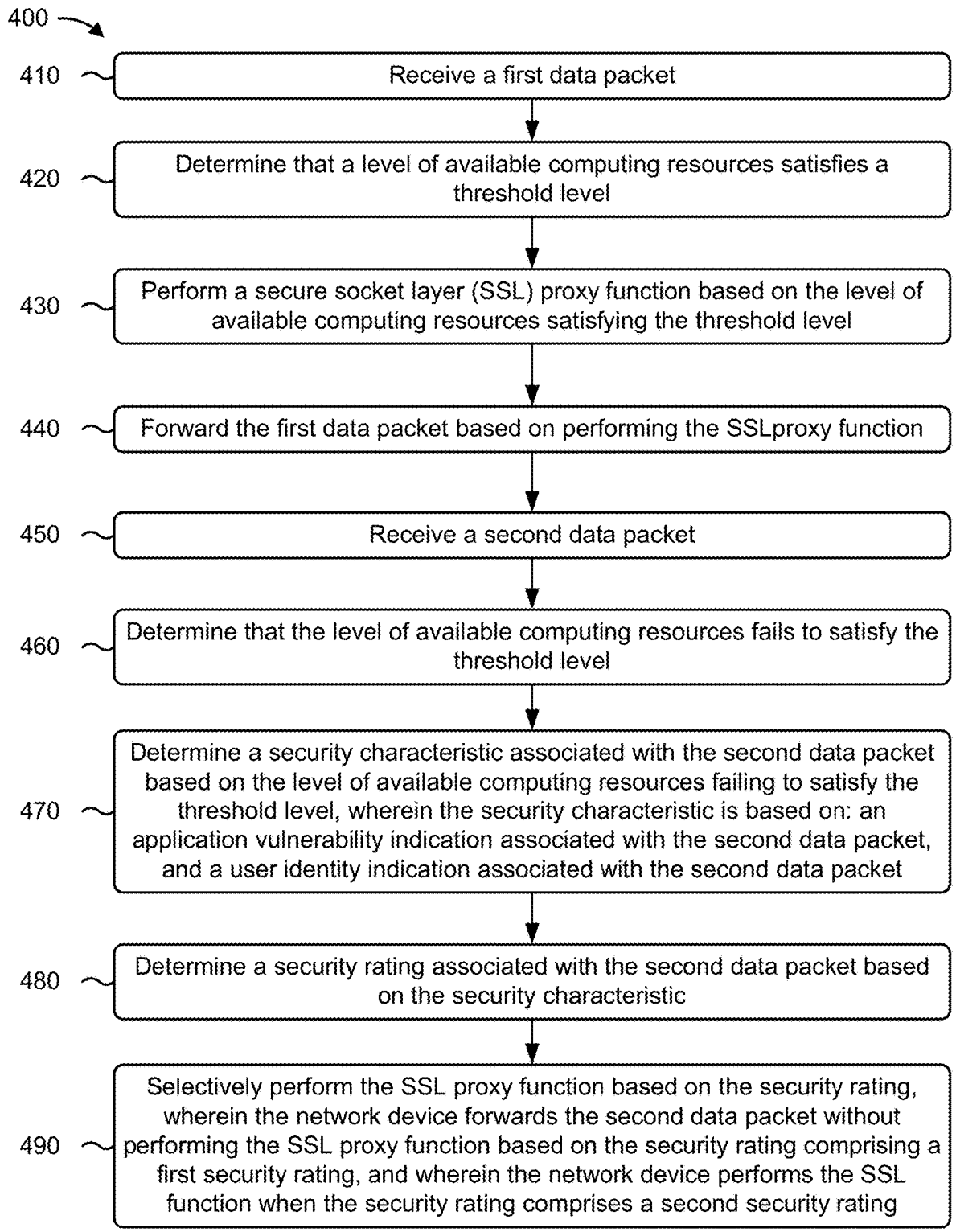

FIG. 4 is a flow chart of an example process 400 for performing SSL proxy whitelisting. In some implementations, one or more process blocks of FIG. 4 may be performed by a network device (e.g., security device 220). In some implementations, one or more process blocks of FIG. 4 may be performed by another device or a group of devices separate from or including the network device, such as a client device (e.g., client device 210), a server device (e.g., server device 230), and/or the like.

As shown in FIG. 4, process 400 may include receiving a first data packet (block 410). For example, the network device (e.g., using processor 310, memory 315, storage component 320, input component 325, output component 330, communication interface 335, input component 355, switching component 360, output component 365, controller 370, and/or the like) may receive a first data packet, as described above.

As further shown in FIG. 4, process 400 may include determining that a level of available computing resources satisfies a threshold level (block 420). For example, the network device (e.g., using processor 310, memory 315, storage component 320, input component 325, output component 330, communication interface 335, input component 355, switching component 360, output component 365, controller 370, and/or the like) may determine that a level of available computing resources satisfies a threshold level, as described above.

As further shown in FIG. 4, process 400 may include performing a secure socket layer (SSL) proxy function based on the level of available computing resources satisfying the threshold level (block 430). For example, the network device (e.g., using processor 310, memory 315, storage component 320, input component 325, output component 330, communication interface 335, input component 355, switching component 360, output component 365, controller 370, and/or the like) may perform a secure socket layer (SSL) proxy function based on the level of available computing resources satisfying the threshold level, as described above.

As further shown in FIG. 4, process 400 may include forwarding the first data packet based on performing the SSL proxy function (block 440). For example, the network device (e.g., using processor 310, memory 315, storage component 320, input component 325, output component 330, communication interface 335, input component 355, switching component 360, output component 365, controller 370, and/or the like) may forward the first data packet based on performing the SSL proxy function, as described above.

As further shown in FIG. 4, process 400 may include receiving a second data packet (block 450). For example, the network device (e.g., using processor 310, memory 315, storage component 320, input component 325, output component 330, communication interface 335, input component 355, switching component 360, output component 365, controller 370, and/or the like) may receive a second data packet, as described above.

As further shown in FIG. 4, process 400 may include determining that the level of available computing resources fails to satisfy the threshold level (block 460). For example, the network device (e.g., using processor 310, memory 315, storage component 320, input component 325, output component 330, communication interface 335, input component 355, switching component 360, output component 365, controller 370, and/or the like) may determine that the level of available computing resources fails to satisfy the threshold level, as described above.

As further shown in FIG. 4, process 400 may include determining a security characteristic associated with the second data packet based on the level of available computing resources failing to satisfy the threshold level, wherein the security characteristic is based on: an application vulnerability indication associated with the second data packet, and a user identity indication associated with the second data packet (block 470). For example, the network device (e.g., using processor 310, memory 315, storage component 320, input component 325, output component 330, communication interface 335, input component 355, switching component 360, output component 365, controller 370, and/or the like) may determine a security characteristic associated with the second data packet based on the level of available computing resources failing to satisfy the threshold level, as described above. In some implementations, the security characteristic is based on an application vulnerability indication associated with the second data packet. In some implementations, the security characteristic is based on a user identity indication associated with the second data packet.

As further shown in FIG. 4, process 400 may include determining a security rating associated with the second data packet based on the security characteristic (block 480). For example, the network device (e.g., using processor 310, memory 315, storage component 320, input component 325, output component 330, communication interface 335, input component 355, switching component 360, output component 365, controller 370, and/or the like) may determine a security rating associated with the second data packet based on the security characteristic, as described above.

As further shown in FIG. 4, process 400 may include selectively performing the SSL proxy function based on the security rating, wherein the network device forwards the second data packet without performing the SSL proxy function based on the security rating comprising a first security rating, and wherein the network device performs the SSL function when the security rating comprises a second security rating (block 490). For example, the network device (e.g., using processor 310, memory 315, storage component 320, input component 325, output component 330, communication interface 335, input component 355, switching component 360, output component 365, controller 370, and/or the like) may selectively perform the SSL proxy function based on the security rating, as described above. In some implementations, the network device forwards the second data packet without performing the SSL proxy function based on the security rating comprising a first security rating. In some implementations, the network device performs the SSL function when the security rating comprises a second security rating.

Process 400 may include additional implementations, such as any single implementation or any combination of implementations described below and/or in connection with one or more other processes described elsewhere herein.

In a first implementation, the security characteristic is further based on a security characteristic that is associated with a client device that is associated with the second data packet.

In a second implementation, alone or in combination with the first implementation, determining the security characteristic comprises: determining a vulnerability level associated with a user associated with the second data packet based on the user identity indication.

In a third implementation, alone or in combination with one or more of the first and second implementations, determining that the level of available computing resources fails to satisfy the threshold level comprises: determining that an amount of available memory associated with the network device fails to satisfy a threshold amount of available memory.

In a fourth implementation, alone or in combination with one or more of the first through third implementations, the security rating comprises the second security rating, the method further comprising: identifying a vulnerability associated with the second data packet based on performing the SSL proxy function; dropping the second data packet based on identifying the vulnerability, and storing information identifying the vulnerability in a memory associated with the network device.

In a fifth implementation, alone or in combination with one or more of the first through fourth implementations, process 400 includes obtaining a health rating associated with the application from a server device; and determining the application vulnerability indication based on the health rating.

In a sixth implementation, alone or in combination with one or more of the first through fifth implementations, process 400 includes determining the user identity indication based on one or more of: validating a client certificate associated with the second data packet; or authenticating a user associated with the second data packet.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
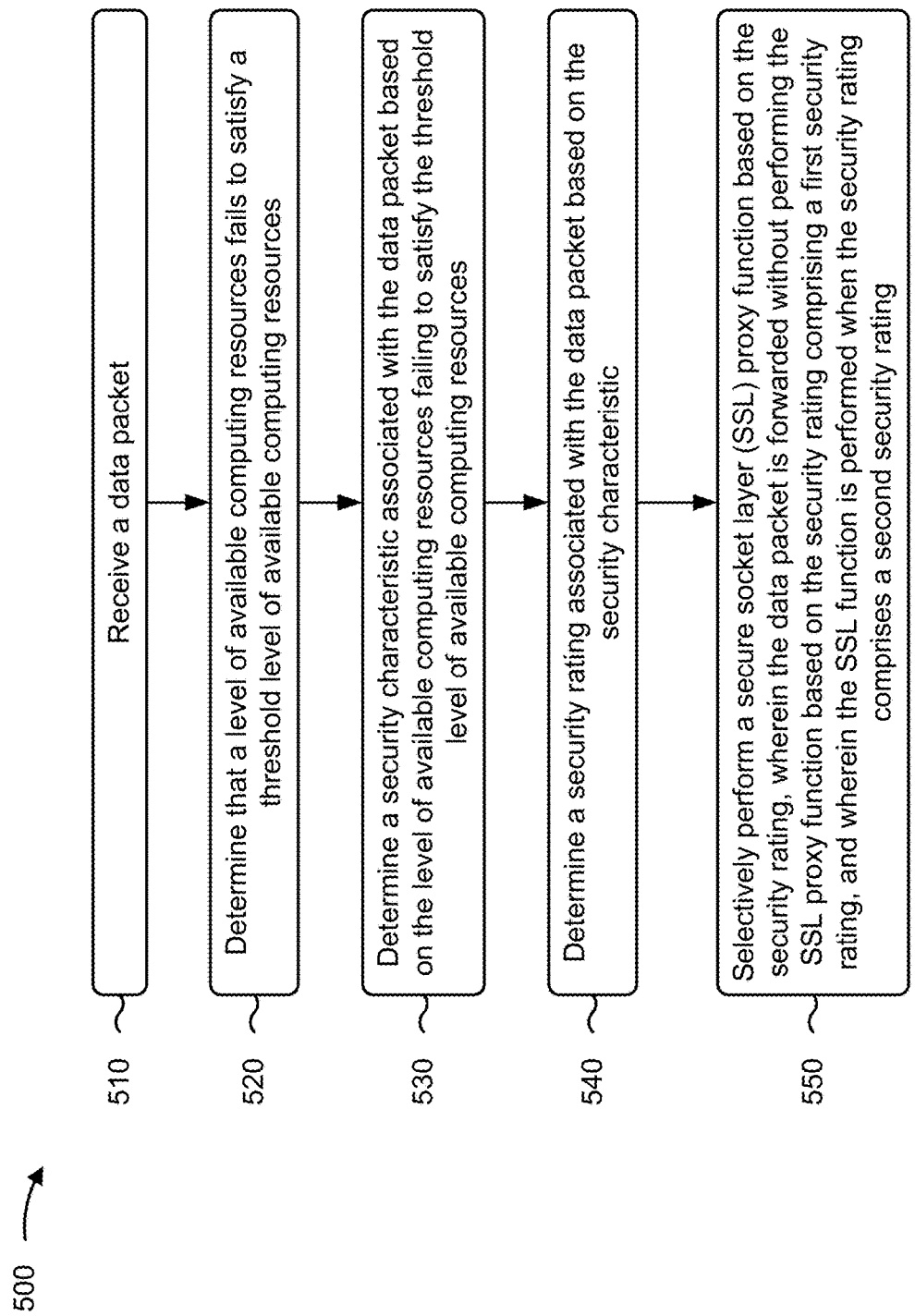

FIG. 5 is a flow chart of an example process 500 for performing SSL proxy whitelisting. In some implementations, one or more process blocks of FIG. 5 may be performed by a network device (e.g., security device 220). In some implementations, one or more process blocks of FIG. 5 may be performed by another device or a group of devices separate from or including the network device, such as a client device (e.g., client device 210), a server device (e.g., server device 230), and/or the like.

As shown in FIG. 5, process 500 may include receiving a data packet (block 510). For example, the network device (e.g., using processor 310, memory 315, storage component 320, input component 325, output component 330, communication interface 335, input component 355, switching component 360, output component 365, controller 370, and/or the like) may receive a data packet, as described above.

As further shown in FIG. 5, process 500 may include determining that a level of available computing resources fails to satisfy a threshold level of available computing resources (block 520). For example, the network device (e.g., using processor 310, memory 315, storage component 320, input component 325, output component 330, communication interface 335, input component 355, switching component 360, output component 365, controller 370, and/or the like) may determine that a level of available computing resources fails to satisfy a threshold level of available computing resources, as described above.

As further shown in FIG. 5, process 500 may include determining a security characteristic associated with the data packet based on the level of available computing resources failing to satisfy the threshold level of available computing resources (block 530). For example, the network device (e.g., using processor 310, memory 315, storage component 320, input component 325, output component 330, communication interface 335, input component 355, switching component 360, output component 365, controller 370, and/or the like) may determine a security characteristic associated with the data packet based on the level of available computing resources failing to satisfy the threshold level of available computing resources, as described above.

As further shown in FIG. 5, process 500 may include determining a security rating associated with the data packet based on the security characteristic (block 540). For example, the network device (e.g., using processor 310, memory 315, storage component 320, input component 325, output component 330, communication interface 335, input component 355, switching component 360, output component 365, controller 370, and/or the like) may determine a security rating associated with the data packet based on the security characteristic, as described above.

As further shown in FIG. 5, process 500 may include selectively performing a secure socket layer (SSL) proxy function based on the security rating, wherein the data packet is forwarded without performing the SSL proxy function based on the security rating comprising a first security rating, and wherein the SSL function is performed when the security rating comprises a second security rating (block 550). For example, the network device (e.g., using processor 310, memory 315, storage component 320, input component 325, output component 330, communication interface 335, input component 355, switching component 360, output component 365, controller 370, and/or the like) may selectively perform a secure socket layer (SSL) proxy function based on the security rating, as described above. In some implementations, the data packet is forwarded without performing the SSL proxy function based on the security rating comprising a first security rating. In some implementations, the SSL function is performed when the security rating comprises a second security rating.

Process 500 may include additional implementations, such as any single implementation or any combination of implementations described below and/or in connection with one or more other processes described elsewhere herein.

In a first implementation, process 500 includes determining that a user associated with the data packet has been authenticated; and determining that the security rating associated with the data packet comprises the first security rating based on the user having been authenticated.

In a second implementation, alone or in combination with the first implementation, process 500 includes determining that the data packet is associated with a valid client certificate; and determining that the security rating associated with the data packet comprises the first security rating based on the data packet being associated with the valid client certificate.

In a third implementation, alone or in combination with one or more of the first and second implementations, process 500 includes identifying an application associated with the data packet; determining a health rating associated with the application; and determining the security characteristic based on the health rating.

In a fourth implementation, alone or in combination with one or more of the first through third implementations, process 500 includes determining a website associated with the data packet; and obtaining information identifying a security assessment associated with the website; and determining the security characteristic based on the security assessment.

In a fifth implementation, alone or in combination with one or more of the first through fourth implementations, process 500 includes determining an application associated with the data packet; determining a user associated with the data packet; and determining the security characteristic based on the application and the user.

In a sixth implementation, alone or in combination with one or more of the first through fifth implementations, process 500 includes obtaining a username and a password associated with a user associated with the data packet; authenticating the user based on the username and the password; and determining the security characteristic based on authenticating the user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for performing SSL proxy whitelisting. In some implementations, one or more process blocks of FIG. 6 may be performed by a network device (e.g., security device 220). In some implementations, one or more process blocks of FIG. 6 may be performed by another device or a group of devices separate from or including the network device, such as a client device (e.g., client device 210), a server device (e.g., server device 230), and/or the like.

As shown in FIG. 6, process 600 may include determining that a level of available computing resources satisfies a threshold level of available computing resources during a first time period (block 610). For example, the network device (e.g., using processor 310, memory 315, storage component 320, input component 325, output component 330, communication interface 335, input component 355, switching component 360, output component 365, controller 370, and/or the like) may determine that a level of available computing resources satisfies a threshold level of available computing resources during a first time period, as described above.

As further shown in FIG. 6, process 600 may include performing a secure socket layer (SSL) proxy function for each data packet received during the first time period based on the level of available computing resources satisfying the threshold level of available computing resources (block 620). For example, the network device (e.g., using processor 310, memory 315, storage component 320, input component 325, output component 330, communication interface 335, input component 355, switching component 360, output component 365, controller 370, and/or the like) may perform a secure socket layer (SSL) proxy function for each data packet received during the first time period based on the level of available computing resources satisfying the threshold level of available computing resources, as described above.

As further shown in FIG. 6, process 600 may include determining that the level of available computing resources fails to satisfy the threshold level of available computing resources during a second time period (block 630). For example, the network device (e.g., using processor 310, memory 315, storage component 320, input component 325, output component 330, communication interface 335, input component 355, switching component 360, output component 365, controller 370, and/or the like) may determine that the level of available computing resources fails to satisfy the threshold level of available computing resources during a second time period, as described above.

As further shown in FIG. 6, process 600 may include selectively performing the SSL proxy function for each data packet received during the second time period based on the level of available computing resources failing to satisfy the threshold level of available computing resources, wherein the SSL proxy function is not performed for a first data packet received during the second time period based the first data packet being classified as a low security risk data packet, and wherein the SSL proxy function is performed for a second data packet received during the second time period based the second data packet being classified as a high security risk data packet (block 640). For example, the network device (e.g., using processor 310, memory 315, storage component 320, input component 325, output component 330, communication interface 335, input component 355, switching component 360, output component 365, controller 370, and/or the like) may selectively perform the SSL proxy function for each data packet received during the second time period based on the level of available computing resources failing to satisfy the threshold level of available computing resources, as described above. In some implementations, the SSL proxy function is not performed for a first data packet received during the second time period based the first data packet being classified as a low security risk data packet. In some implementations, the SSL proxy function is performed for a second data packet received during the second time period based the second data packet being classified as a high security risk data packet.

Process 600 may include additional implementations, such as any single implementation or any combination of implementations described below and/or in connection with one or more other processes described elsewhere herein.

In a first implementation, process 600 includes determining that the level of available computing resources satisfies the threshold level of available computing resources during a third time period; and performing the SSL proxy function for each data packet received during the third time period based on the level of available computing resources satisfying the threshold level of available computing resources.

In a second implementation, alone or in combination with the first implementation, process 600 includes obtaining information identifying a group of users associated with a security risk rating; determining that a user associated with the second data packet is associated with the security risk rating based on the information identifying the group of users; and classifying the second data packet as the high security risk data packet based on the user being associated with the security risk rating.

In a third implementation, alone or in combination with one or more of the first and second implementations, process 600 includes determining an application associated with the second data packet; determining that the application is associated with a security vulnerability; and classifying the second data as the high security risk data packet based on the application being associated with the security vulnerability.

In a fourth implementation, alone or in combination with one or more of the first through third implementations, process 600 includes determining an amount of available processor resources; and determining that the level of available computing resources satisfies the threshold level of available computing resources during the first time period based on the amount of available processor resources.

In a fifth implementation, alone or in combination with one or more of the first through fourth implementations, process 600 includes identifying a security vulnerability associated with the second data packet based on performing the SSL proxy function; and determining not to forward the second data packet based on identifying the security vulnerability.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more memories; and
   one or more processors to:
   determine that a data packet is associated with a valid client certificate;
   determine a security rating associated with the data packet based on the data packet being associated with the valid client certificate; and
   selectively perform a secure socket layer (SSL) proxy function based on whether the security rating is a first security rating or a second security rating.

2. The device of claim 1, wherein the one or more processors, to selectively perform the SSL proxy function, are to:
   forward the data packet without performing the SSL proxy function when the security rating is the first security rating.

3. The device of claim 1, wherein the one or more processors, to selectively perform the SSL proxy function, are to:
   perform the SSL proxy function when the security rating is the second security rating.

4. The device of claim 1, wherein the one or more processors, to determine the security rating associated with the data packet, are to:
   determine that the security rating associated with the data packet comprises the first security rating based on the data packet being associated with the valid client certificate.

5. The device of claim 1, wherein the one or more processors are further to:
   authenticate a user associated with the data packet.

6. The device of claim 1, wherein the one or more processors, to determine the security rating associated with the data packet, are to:
   determine that the client certificate is not valid; and
   determine that the security rating associated with the data packet comprises the second security rating based on the data packet being associated with the client certificate when the client certificate is not valid.

7. The device of claim 1, wherein the one or more processors are further to:
determine that a level of available computing resources fails to satisfy a threshold level of available computing resources.

8. A method, comprising:
determining, by a network device, that a data packet is associated with a valid client certificate;
determining, by the network device, that a security rating associated with the data packet comprises a first security rating based on the data packet being associated with the valid client certificate; and
selectively perform, by the network device, a secure socket layer (SSL) proxy function based on whether the security rating is the first security rating or a second security rating.

9. The method of claim 8, further comprising:
determining that a level of available computing resources fails to satisfy a threshold level of available computing resources.

10. The method of claim 8, wherein determining the security rating associated with the data packet comprises:
determining the client certificate has expired; and
determining that the security rating associated with the data packet comprises the second security rating based on the data packet being associated with the client certificate when the client certificate expired.

11. The method of claim 8, wherein the security rating is determined based on one or more security characteristics associated with the data packet.

12. The method of claim 8, wherein the security rating is determined based on one or more of:
application security characteristics,
user security characteristics, or
client device characteristics.

13. The method of claim 8, wherein selectively performing the SSL proxy function comprises:
forwarding the data packet without performing the SSL proxy function when the security rating is the first security rating.

14. The method of claim 8, wherein selectively performing the SSL proxy function comprises:
performing the SSL proxy function when the security rating is the second security rating.

15. A non-transitory computer-readable medium storing instructions, the instructions comprising:
one or more instructions that, when executed by one or more processors, cause the one or more processors to:
determine that a data packet is associated with a valid client certificate;
determine a security rating associated with the data packet based on the data packet being associated with the valid client certificate; and
selectively perform a secure socket layer (SSL) proxy function based on whether the security rating is a first security rating or a second security rating.

16. The non-transitory computer-readable medium of claim 15, wherein the one or more instructions, when executed by the one or more processors, further cause the one or more processors to:
determine that a level of available computing resources fails to satisfy a threshold level of available computing resources.

17. The non-transitory computer-readable medium of claim 15, wherein the one or more instructions, that cause the one or more processors to selectively perform the SSL proxy function, cause the one or more processors to:
forward the data packet without performing the SSL proxy function when the security rating is the first security rating; and
perform the SSL proxy function when the security rating comprises the second security rating.

18. The non-transitory computer-readable medium of claim 15, wherein the one or more instructions, that cause the one or more processors to determine the security rating associated with the data packet, cause the one or more processors to:
determine that the security rating associated with the data packet comprises the first security rating based on the data packet being associated with the valid client certificate.

19. The non-transitory computer-readable medium of claim 15, wherein the one or more instructions, that cause the one or more processors to determine the security rating associated with the data packet, cause the one or more processors to:
determine that the client certificate is not valid; and
determine that the security rating associated with the data packet comprises the second security rating based on the data packet being associated with the client certificate when the client certificate is not valid.

20. The non-transitory computer-readable medium of claim 15, wherein the security rating is determined based on one or more of:
application security characteristics,
user security characteristics, and/or
client device characteristics.

* * * * *